(12) United States Patent
Girardin

(10) Patent No.: US 7,452,170 B2
(45) Date of Patent: Nov. 18, 2008

(54) RESTRAINT SYSTEM

(75) Inventor: Jean Marc Girardin, Golden Beach, FL (US)

(73) Assignee: Valeda Company LLC, Fort Lauderdale, FL (US)

( * ) Notice: Subject to any disclaimer, the term of this patent is extended or adjusted under 35 U.S.C. 154(b) by 314 days.

(21) Appl. No.: 11/252,326

(22) Filed: Oct. 17, 2005

(65) Prior Publication Data

US 2006/0110230 A1  May 25, 2006

Related U.S. Application Data

(60) Provisional application No. 60/618,572, filed on Oct. 15, 2004.

(51) Int. Cl.
*B60P 3/06* (2006.01)
(52) U.S. Cl. .................................................. 410/23
(58) Field of Classification Search ............. 296/65.04; 410/2–4, 7–12, 23
See application file for complete search history.

(56) References Cited

U.S. PATENT DOCUMENTS

| | | | | |
|---|---|---|---|---|
| 5,145,299 A | * | 9/1992 | Stephenson, Jr. ............. | 410/100 |
| 5,295,664 A | * | 3/1994 | Kamper ....................... | 254/220 |
| 5,628,595 A | | 5/1997 | Harris ........................... | 410/7 |
| 6,406,230 B1 | * | 6/2002 | Mason et al. .................. | 410/7 |
| 6,524,039 B1 | * | 2/2003 | Magnuson et al. ............ | 410/23 |
| 6,899,497 B2 | * | 5/2005 | Cardona et al. ............... | 410/12 |
| 7,040,847 B1 | * | 5/2006 | Cardona ........................ | 410/7 |
| 2003/0190208 A1 | * | 10/2003 | Cardona et al. ................ | 410/7 |
| 2004/0045757 A1 | * | 3/2004 | Midorikawa et al. .......... | 180/268 |

\* cited by examiner

*Primary Examiner*—H Gutman
(74) *Attorney, Agent, or Firm*—Baker & McKenzie LLP; David I. Roche; Daniel A. Tallitsch

(57) ABSTRACT

A control device for controlling a restraint belt retractor, comprises a latch portion, a cable with a first end arranged to be joined to the latch portion and a second end arranged to be operatively associated with the restraint belt retractor, the latch portion being movable between a first position in which the cable is arranged to maintain the restraint belt retractor in a locked position and a second position in which the cable is arranged to maintain the restraint belt retractor in a released position, a displacement portion for displacing the latch portion between the first and second positions, the latch portion being biased toward the first position, a suspension portion for suspending the latch portion at or near the second position for a predetermined period of time, thereby to permit operation of the restraint belt retractor in the released position.

17 Claims, 15 Drawing Sheets

RESTRAINT SYSTEM

REFERENCE TO CO-PENDING APPLICATION

The entire subject matter of U.S. application Ser. No. 60/618,572 entitled AUTOMATIC BELT RETRACTOR RELEASE SYSTEM and filed Oct. 15, 2004 is incorporated by reference.

BACKGROUND OF THE INVENTION

1. Field of the Invention

This invention relates to restraint systems such as those used for wheelchair passenger carrying vehicles.

2. Description of the Related Art

Normally tracks are provided in the floor of a bus, or other conveyance for wheelchairs and their occupants, to receive an anchor point that can be moved forward or backwards as required for different wheelchairs. The anchor point also usually incorporates a belt retractor system, similar to that in a car seat belt system, to hold the wheelchair securely during travel. Upon reaching the destination, however, a wheelchair occupant is usually physically incapable of reaching down and releasing the retractor so that the securing straps can be unhooked.

SUMMARY OF THE INVENTION

Briefly stated, the invention provides a control device for controlling a restraint belt retractor, comprising a latch portion, a cable with a first end arranged to be joined to the latch portion and a second end arranged to be operatively associated with the restraint belt retractor, the latch portion being movable between a first position in which the cable is arranged to maintain the restraint belt retractor in a locked position and a second position in which the cable is arranged to maintain the restraint belt retractor in a released position, a displacement portion for displacing the latch portion between the first and second positions, the latch portion being biased toward the first position, a suspension portion for suspending the latch portion at or near the second position for a predetermined period of time, thereby to permit operation of the restraint belt retractor in the released position.

In an embodiment, the suspension portion includes a solenoid unit with a plunger coupled with the latch portion, the solenoid unit being operable under a control signal to fix the position of the plunger.

In an embodiment, the solenoid is operable under the control signal, prior to fixing the position of the plunger, to displace the latch portion to second position.

An embodiment further comprises a base frame portion, the latch portion being slidably engaged therewith.

Another embodiment further comprises a timing circuit for delivering the control signal to the solenoid.

In an embodiment, the timing circuit includes a switch unit and a power supply unit, the switch unit being operable to command the power supply unit to deliver the control signal when the latch portion arrives at or near the second position.

In an embodiment, the latch portion has an abutment, the switch unit including a proximity switch to signal the solenoid when the proximity switch contacts the abutment.

Another embodiment further comprises a bracket fastened to the base frame portion and supporting the proximity switch.

In an embodiment, the base frame portion includes first and second offset base frame segments joined by a central segment extending therebetween.

In an embodiment, the first base frame segment engages the latch portion and the second base frame segment engages the solenoid.

In an embodiment, the first base frame segment includes a first window, the latch portion having a flange extending through the first window, the first window and flange being arranged to interrupt a travel path of the displacement portion.

In an embodiment, the latch portion includes a flange which is arranged to interrupt a travel path of the displacement portion.

Another embodiment further comprises a housing to enclose the latch portion, the base frame portion and the solenoid, the housing including a second window aligned with the first window.

In an embodiment, the displacement portion includes a handle pivotally mounted to housing, the handle having a central web to engage the flange.

In an embodiment, the displacement portion includes a handle pivotally mounted to housing, the handle having a central web to engage the flange.

Another embodiment further comprises a spring element operating between the central segment and latch portion to bias the latch portion toward the first position.

In an embodiment, the central segment includes a passage, the latch portion extending through the passage with a remote end region which is coupled with the plunger.

In an embodiment, the latch portion includes first and second offset latch segments joined by an intermediate segment, the second latch segment extending through the passage.

In an embodiment, the second latch segment includes a slot to receive the plunger.

In an embodiment, the second latch segment extending through the spring element.

In an embodiment, the first latch segment is coupled with the cable.

In an embodiment, the first latch segment includes a slot to receive the cable.

In an embodiment, the first latch segment has a pair of spaced anchor formations to receive the cable therebetween.

In an embodiment, each anchor formation includes a web with the slot formed in a central region thereof.

In an embodiment, the anchor formations are operable to displace the cables between the first and second positions.

In an embodiment, the cable includes an outer sheath, the outer sheath being coupled with the base frame portion.

In an embodiment, the base frame portion includes a passage, the cable including an outer collar portion held within the passage.

In an embodiment, the first base frame segment includes a pair of opposed base frame portion boundary walls, the boundary walls having aligned passages to receive an anchor pin therein, the anchor pin operable to restrain the latch portion in position adjacent the first base frame segment.

In an embodiment, the first base frame segment has a surface facing the latch portion, a projection extending outwardly from the surface, the latch portion having a slot which is dimensioned to receive the projection therein, thereby to limit travel of the latch portion according to the travel of the projection along the slot.

In an embodiment, the housing has a body portion with a first opening, and a cover portion to fit within the first opening.

In an embodiment, the handle includes a pair of opposed handle boundary walls, the cover portion having opposed cover walls, the opposed handle boundary and cover walls having aligned pivot locations, and a pivot element located at the aligned pivot locations for pivotally mounting the handle to the cover portion.

In another of its aspects, the present invention provides a restraint belt device, comprising a restraint belt, a restraint belt retractor for controlling an operative length of the restraint belt, a latch portion, a cable with a first end joined to the latch portion and a second end operatively associated with the restraint belt retractor, the latch portion being movable between a first position in which the cable is arranged to maintain the restraint belt retractor in a locked position and a second position in which the cable is arranged to maintain the restraint belt retractor in a released position, a displacement portion for displacing the latch portion between the first and second positions, a suspension portion for suspending the latch portion at or near the second position for a predetermined period of time, thereby to permit operation of the restraint belt retractor in the released position.

In another of its aspects, the present invention provides a restraint belt device, comprising a plurality of restraint belts, a plurality of restraint belt retractors, each for controlling an operative length of a corresponding restraint belt, a latch portion, a plurality of cables, each with a first end joined to the latch portion and a second end operatively associated with a corresponding restraint belt retractor, the latch portion being movable between a first position in which the cable is arranged to maintain the restraint belt retractor in a locked position and a second position in which the cable is arranged to maintain the restraint belt retractor in a released position, a displacement portion for displacing the latch portion between the first and second positions, the latch portion being biased toward the first position, a suspension portion for suspending the latch portion at or near the second position for a predetermined period of time, thereby to permit operation of the restraint belt retractor in the released position.

In another of its aspects, the present invention provides a restraint belt device, comprising a plurality of restraint belts, a plurality of restraint belt retractors, each for controlling an operative length of a corresponding restraint belt, a latch portion, one or more cables with a first end joined to the latch portion and a second end operatively associated with one or more of the restraint belt retractors, the latch portion being movable between a first position in which the cable is arranged to maintain the restraint belt retractor in a locked position and a second position in which the cable is arranged to maintain the restraint belt retractor in a released position, a displacement portion for displacing the latch portion between the first and second positions, the latch portion being biased toward the first position, a suspension portion for suspending the latch portion at or near the second position for a predetermined period of time, thereby to permit operation of the restraint belt retractor in the released position.

In yet another of its aspects, the present invention provides a cargo carrying vehicle, comprising a cargo-receiving location for receiving at least one item of cargo, a restraint device for securing the at least one item of cargo at the cargo-receiving location, the restraint device including a plurality of flexible restraint members, a plurality of restraint members retractors, each for controlling an operative length of a corresponding restraint member, a latch portion, a plurality of cables, each with a first end joined to the latch portion and a second end operatively associated with a corresponding restraint member retractor, the latch portion being movable between a first position in which the cable is arranged to maintain the restraint member retractor in a locked position and a second position in which the cable is arranged to maintain the restraint member retractor in a released position, a displacement portion for displacing the latch portion between the first and second positions, the latch portion being biased toward the first position, a suspension portion for suspending the latch portion at or near the second position for a predetermined period of time, thereby to permit operation of the restraint member retractor in the released position.

In an embodiment, the flexible restraint member includes a cable portion, a chain portion, a cord portion and/or a belt portion.

In another of its aspects, the present invention provides a wheel chair passenger carrying vehicle, comprising a wheel chair receiving location for receiving at least one wheel chair, a restraint device for securing the at least one wheel chair at the wheel chair receiving location, the restraint device including a plurality of flexible restraint members, a plurality of restraint member retractors, each for controlling an operative length of a corresponding restraint member, a latch portion, a plurality of cables, each with a first end joined to the latch portion and a second end operatively associated with a corresponding restraint member retractor, the latch portion being movable between a first position in which the cable is arranged to maintain the restraint member retractor in a locked position and a second position in which the cable is arranged to maintain the restraint member retractor in a released position, a displacement portion for displacing the latch portion between the first and second positions, the latch portion being biased toward the first position, a suspension portion for suspending the latch portion at or near the second position for a predetermined period of time, thereby to permit operation of the restraint member retractor in the released position.

In yet another of its aspects, the present invention provides a method of controlling a restraint member retractor, comprising the steps of providing a latch portion, joining a first end of a cable to the latch portion, joining a second end of the cable to a restraint belt retractor, arranging the latch portion to move between a first position in which the cable is operable to maintain the restraint member retractor in a locked orientation and a second position in which the cable is operable to maintain the restraint member retractor in a released orientation, biasing the latch portion towards the first position, displacing the latch portion to a location at or near the second position, automatically suspending the latch portion in the location at or near the second position for a predetermined period of time to permit operation of the restraint member retractor in the released position, and releasing the latch portion from the location at or near the second position so that it can return to the first position, for the cable to cause the restraint member retractor to return to its locked orientation.

In another of its aspects, the present invention provides a method of controlling a restraint member retractor, comprising a step for providing a latch portion, joining a first end of a cable to the latch portion, a step for joining a second end of the cable to a restraint member retractor, a step for arranging the latch portion to move between a first position in which the cable is operable to maintain the restraint member retractor in a locked orientation and a second position in which the cable is operable to maintain the restraint member retractor in a released orientation, a step for displacing the latch portion to a location at or near the second position, a step for automatically suspending the latch portion in the location at or near the second position for a predetermined period of time to permit operation of the restraint member retractor in the released position, and a step for releasing the latch portion from the location at or near the second position so that it can return to the first position, for the cable to cause the restraint member retractor to return to its locked orientation.

In another of its aspects, the present invention provides a control device for controlling a restraint belt retractor, comprising latch means, cable means with a first end arranged to be joined to the latch means and a second end arranged to be operatively associated with the restraint belt retractor, the latch means being movable between a first position in which the cable means is arranged to maintain the restraint belt retractor in a locked position and a second position in which the cable is arranged to maintain the restraint belt retractor in a released position, displacement means for displacing the latch means between the first and second positions, the latch means being biased toward the first position, suspension means for suspending the latch portion at or near the second position for a predetermined period of time, thereby to permit operation of the restraint belt retractor in the released position.

In another of its aspects, the present invention provides a restraint belt device, comprising a restraint belt, a restraint belt retractor means for controlling an operative length of the restraint belt, a latch means, cable means with a first end joined to the latch means and a second end operatively associated with the restraint belt retractor means, the latch means being movable between a first position in which the cable means is arranged to maintain the restraint belt retractor means in a locked position and a second position in which the cable means is arranged to maintain the restraint belt retractor means in a released position, displacement means for displacing the latch means between the first and second positions, suspension means for suspending the latch means at or near the second position for a predetermined period of time, thereby to permit operation of the restraint belt retractor means in the released position In another of its aspects, the present invention provides a belt retractor device, comprising a cable release portion operatively coupled with a belt retractor portion, the belt retractor portion having a length of safety belt coiled therein, the cable release portion having at least one cable with first and second cable ends, the cable release portion having a slide member with an anchor formation to receive the first cable end, and a handle to displace the slide portion between opposed first limit positions, thereby to displace the cable between opposed second limit positions; the belt retractor portion including a trigger operable in a first phase for locking the retractor portion in position and a second phase for releasing the retractor portion to recoil the safety belt, the cable release portion including an actuator operatively joined with the second cable end for actuating the trigger between the first and second phases, the retractor portion further including a dwell unit for suspending the slide portion near one limit position for a predetermined period of time thereby to maintain the trigger in the second phase for the predetermined period of time.

In another of its aspects, the present invention provides a restraint belt control device comprising a belt retractor portion and a remote belt release portion communicating therewith, the belt retractor portion being operable between a first rest position and a second activated position, and a dwell portion associated with the remote belt release portion and/or the belt retractor portion, the dwell portion being operable in a first phase for maintaining the belt retractor portion in the first activated position for a predetermined time period and a second phase for releasing the belt retractor portion from the first activated position.

Another embodiment further comprises a cable joining the remote belt release portion with the belt retractor portion, the cable being moveable between two limit positions to transfer the belt retractor portion between the first rest position and the second activated position, the dwell portion being operable to control the deployment of the cable between the two limit positions.

In an embodiment, in the second phase, the dwell portion is operable to displace the cable to one of the limit positions to return the belt retractor to the first rest position.

In an embodiment, the remote belt release portion includes a base and a latch moveable relative thereto, the dwell portion being coupled between the base and the latch.

In an embodiment, the dwell portion includes a solenoid with a plunger, the plunger being coupled with the latch and a timing circuit for operating the solenoid between the first and second phases.

In yet another of its aspects, the present invention provides a control device for controlling a restraint belt retractor, comprising a deployment portion including latch portion, a cable with a first end arranged to be joined to the latch portion and a second end arranged to be operatively associated with the restraint belt retractor, the latch portion being movable between a first position in which the cable is arranged to maintain the restraint belt retractor in a locked position and a second position in which the cable is arranged to maintain the restraint belt retractor in a released position, a displacement portion moveably mounted relative to the deployment portion for displacing the latch portion between the first and second positions, the latch portion being biased toward the first position, a suspension portion for suspending the latch portion at or near the second position for a predetermined period of time, thereby to permit operation of the restraint belt retractor in the released position.

In still another of its aspects, the present invention provides a method of controlling a restraint member retractor, comprising the steps of providing a restraint member retractor, providing the restraint member retractor with a trigger to transfer the restraint member retractor from a lock condition to a release condition, providing a remote controller to control the position of the trigger, providing a communication link between the remote controller and the trigger for control signals to be exchanged therebetween, and providing an automatic suspension function for suspending the trigger in the release position for a predetermined period of time.

In an embodiment, the step of providing a communication link includes the step of providing a cable between the remote controller and the restraint member retractor and arranging an activator on the restraint belt retractor to displace the trigger according to a position of the cable.

In an embodiment, the step of providing a communication link includes providing a wired or wireless communication channel between the restraint member retractor and the remote controller and arranging the restraint member retractor and the remote controller to exchange control signals over the communication channel.

In an embodiment, the step of providing a communication link includes providing a wireless RF data link between the restraint member retractor and the remote controller and arranging the restraint member retractor and the remote controller to exchange control signals over the RF data link.

In still another of its aspects, the present invention provides a restraint system, comprising a belt retractor, a belt retractor controller remote from the belt retractor, a data link between the belt retractor and the belt retractor controller, the belt retractor and the belt retractor controller being operable to exchange control signals over the data link to provide control of the belt tractor by the belt retractor controller, the belt retractor controller being operable in a first phase to lock the belt retractor thereby to lock a belt therein, a second phase to release the belt retractor thereby to allow the belt to withdrawn from or returned to the belt retractor and a third phase to maintain the belt retractor in a released position for a predetermined period of time to permit the belt to be either installed on a cargo item or removed from the cargo item.

In another of its aspects, the present invention provides a method of controlling a restraint member retractor in a wheel chair passenger carrying vehicle, comprising the steps of providing a restraint member retractor with a restraint member, installing the restraint member retractor adjacent a wheel chair receiving location on the vehicle, providing the restraint member retractor with a trigger to transfer the restraint member retractor between a lock condition and a release condition and automatically maintaining the restraint belt retractor in the release condition for a predetermined period of time sufficient for manipulating the restraint member to restrain and/ or to unrestrain a wheel chair from the wheel chair receiving location.

In yet another of its aspects, the present invention provides a restraint member retractor device for restraining a wheel chair in a wheel chair transport vehicle, comprising a restraint belt, a lock portion for retaining the restraint belt either in a lock position or in a release position, a trigger portion to transfer the lock portion between a lock condition and a release condition, the trigger portion being operable for automatically maintaining the lock portion the release condition for a predetermined period of time sufficient for manipulating the restraint member to attach a wheel chair thereto and/or to detach the wheel chair therefrom.

In another of its aspects, the present invention provides a restraint system for restraining an item of cargo on a cargo carrying vehicle, comprising a restraint member, a restraint member actuator, an actuator controller remote from the restraint member actuator, a data link between the restraint member actuator and the actuator controller, the restraint member actuator and the actuator controller being operable to exchange control signals over the data link, the actuator controller being operable in a first phase to lock the restraint member actuator thereby to lock a restraint member, a second phase to release the restraint member actuator thereby to release the restraint member and a third phase to maintain the restraint member actuator in a released position for a predetermined period of time to maintain the restraint member in a released condition for loading and/or unloading the cargo item from the vehicle.

In an embodiment, the restraint member includes a belt and the restraint member actuator is a restraint belt retractor.

In another of its aspects, the present invention provides a deployment device for deploying a restraint member actuator, comprising a latch portion, a cable coupling portion for coupling a first end of a cable thereto, the latch portion being movable between a first position in which the cable coupling portion is arranged to maintain a cable in a lock position for locking a restraint member actuator in a locked position and a second position in which the cable coupling portion is arranged to maintain a cable in a release position for releasing a restraint member actuator from the locked position, a displacement portion for displacing the latch portion between the first and second positions, and a suspension portion for suspending the latch portion at or near the second position for a predetermined period of time, thereby to permit operation of a restraint member actuator in the release position.

In another of its aspects, the present invention provides a method of controlling a restraint member retractor, comprising the steps of providing a restraint member retractor, providing the restraint member retractor with a trigger to transfer the restraint member retractor from a lock condition to a release condition, providing a remote controller to control the position of the trigger, providing a communication link between the remote controller and the trigger for control signals to be exchanged therebetween, and providing an automatic suspension function for suspending the trigger in the release position.

Another embodiment further comprises the step of manually deploying the automatic suspension function and manually deactivating the automatic suspension function.

In an embodiment, the step of providing an automatic suspension function includes the step of providing a solenoid for freezing the position of the trigger.

In an embodiment, the step of freezing the position of the trigger includes the step of providing a cable between the solenoid and the trigger.

In an embodiment, the step of freezing the position of the trigger includes providing a latch between the solenoid and the cable.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Figure 1:
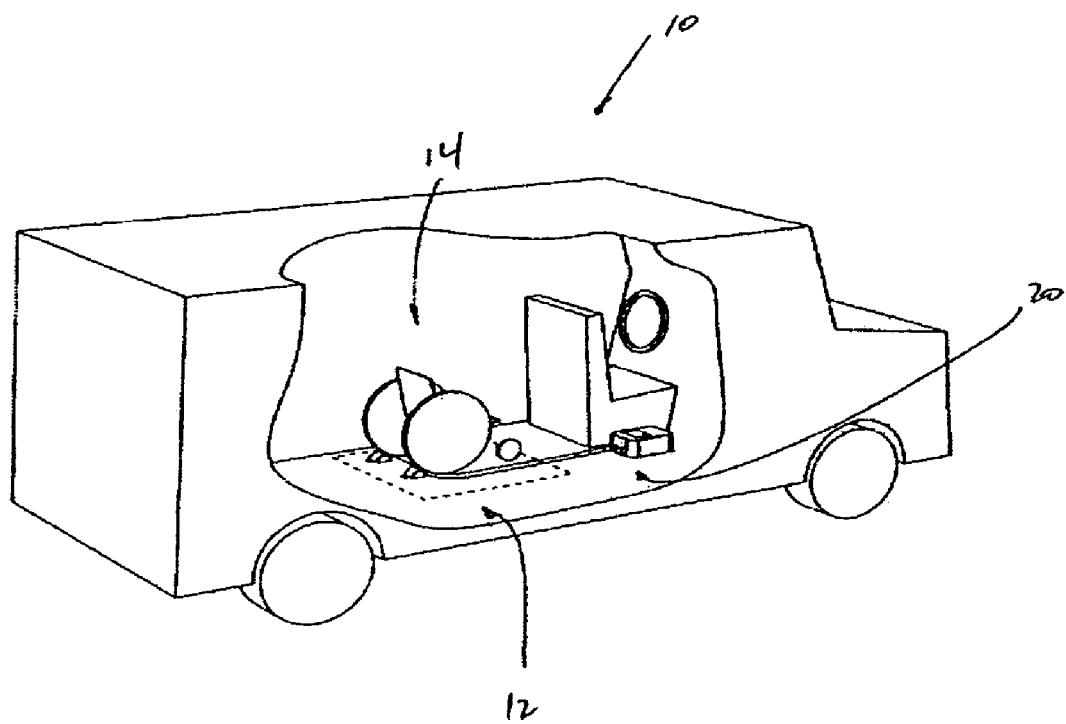
FIG. 1 is a schematic fragmentary perspective view of a wheel chair passenger carrying vehicle.
Figure 2:
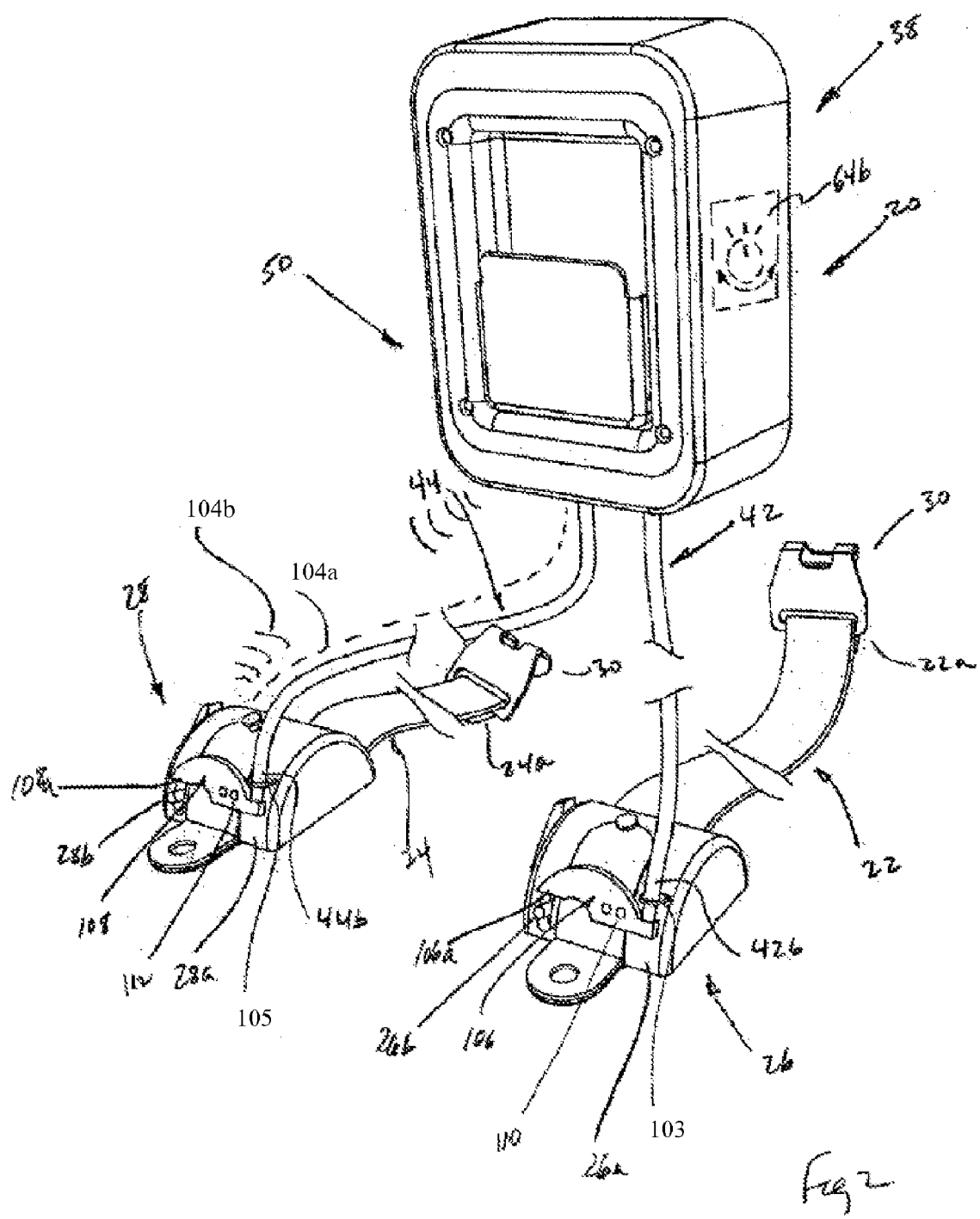
FIG. 2 is a fragmentary perspective view of a restraint device used in the vehicle of FIG. 1.

Referring to FIG. 1, there is provided wheel chair passenger carrying vehicle 10 having a wheel chair receiving location 12 for receiving at least one wheel chair 14 and a restraint device 20 for securing the at least one wheel chair at the wheel chair receiving location 12. Referring to FIG. 2, the restraint device 20 includes a plurality of flexible restraint members 22, 24 and a plurality of restraint member retractors 26, 28, each for controlling an operative length of a corresponding restraint member. The restraint members 22, 24, in this case, are restraint belts, though other restraints may be used such cables, chains, cords and/or belts or various combinations thereof. Conveniently, the restraint belts 22, 24 have, at their distal ends 22a, 24a, a hook 30 or other coupling element for removably attaching the restraint belt to the wheel chair 14.

Figure 4:
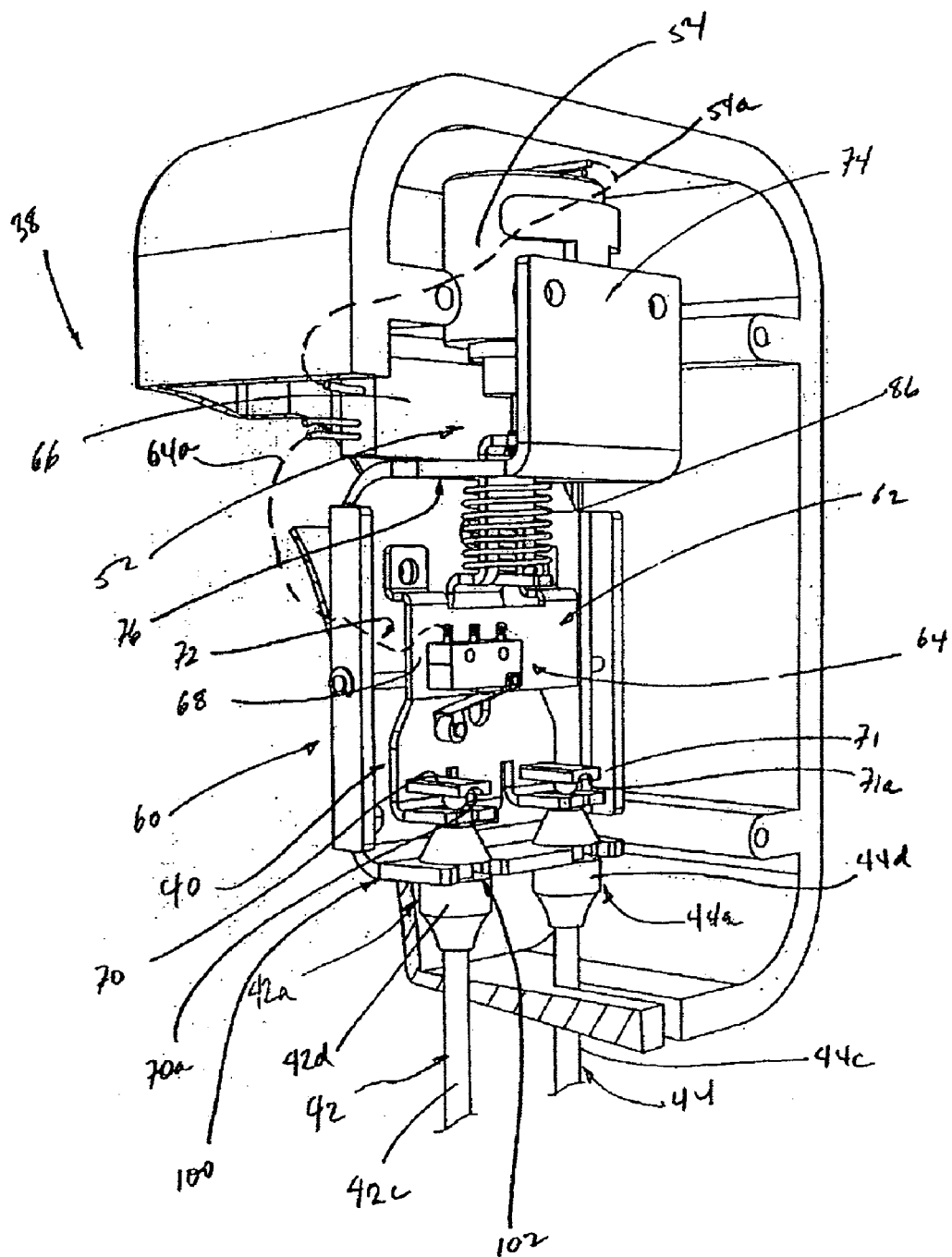
Figure 5:
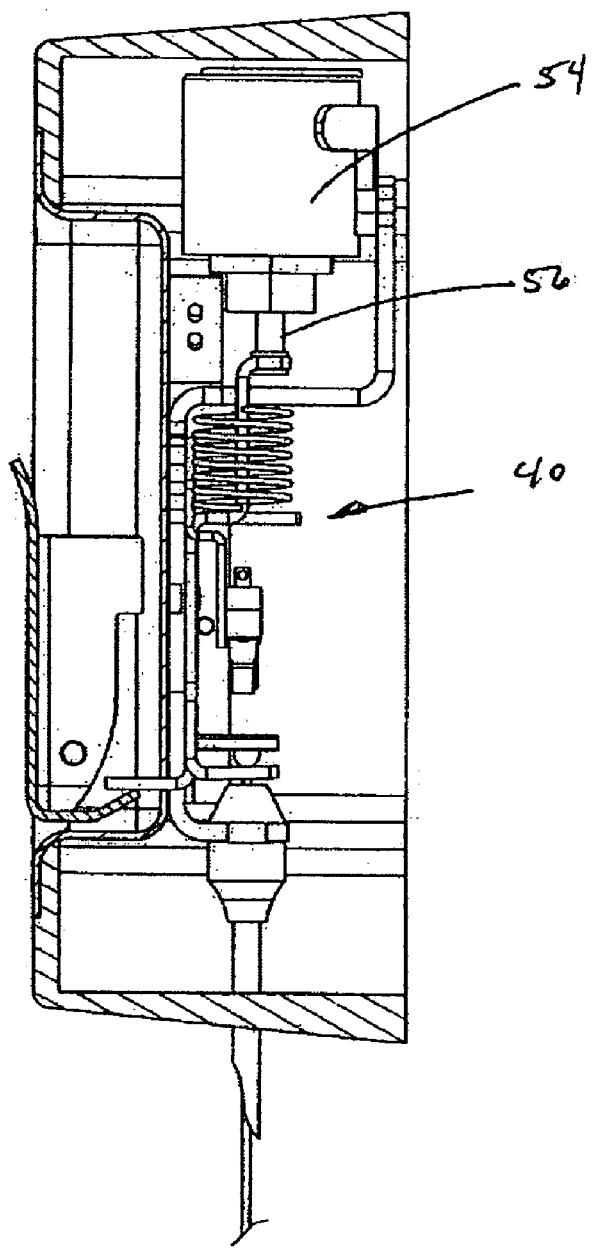
FIGS. 5 and 6 are sectional views of the portion shown in FIGS. 3 and 4.
Figure 6:
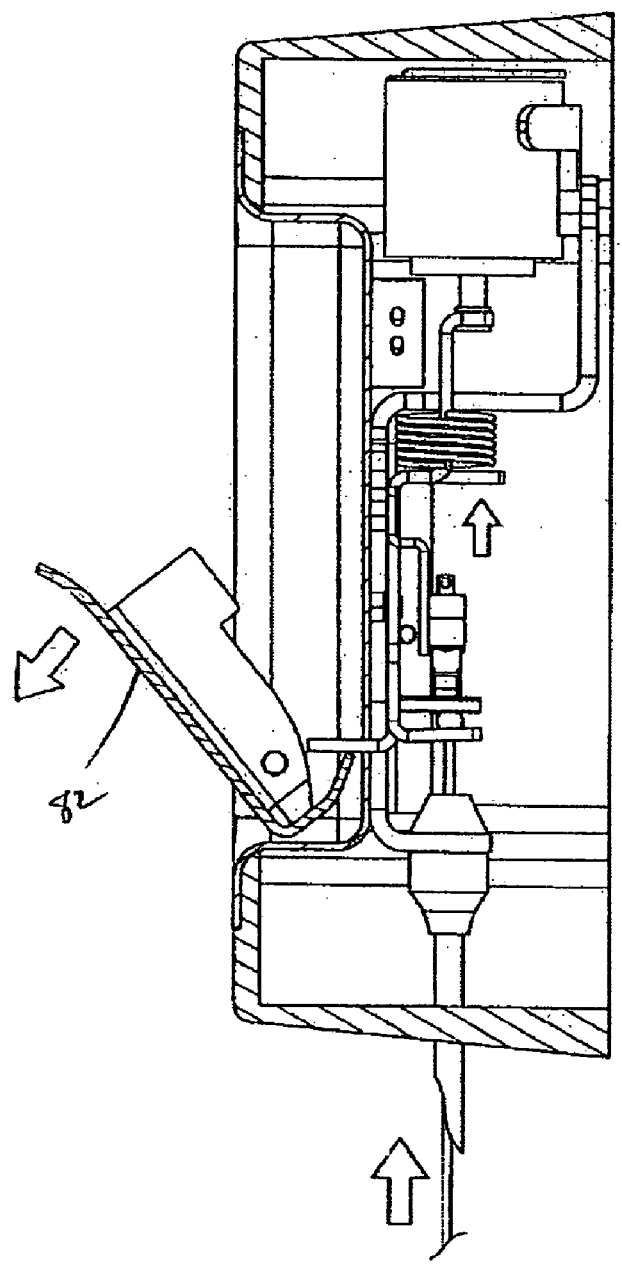

Referring now to FIGS. 2 and 4, the restraint device 20 has a deployment unit shown at 38 with a latch portion 40 and a plurality of (in this case two) cables 42, 44, each with a first end 42a, 44a joined to the latch portion 42 and a second end 42b, 44b operatively associated with a corresponding restraint belt retractor 26, 28. Given that the cables are essentially identical in this example, further discussion immediately below will provide further details of cable 42 only. Generally, the latch portion 40 is movable between a first (or rest) position, as shown in FIG. 5, in which the cable 42 is arranged to maintain the restraint belt retractor 26 in a locked position and a second (or release) position, as shown in FIG. 6, in which the cable 42 is arranged to maintain the restraint belt retractor 26 in a released position. The deployment unit 38 also has a displacement portion generally shown at 50 in FIG. 2 for displacing the latch portion 40 between the first and second positions. As generally shown in FIGS. 4 and 5, a suspension portion 52 is provided for suspending (or temporarily locking) the latch portion 40 at or near the second position for a predetermined period of time (as examples thirty seconds, two minutes, or the like) thereby to permit operation of the restraint belt retractor 26 in its released position.

The suspension portion 52, in this example, includes a solenoid 54 with a plunger 56 coupled with the latch portion 40. As will be described, the solenoid 54 is operable under a control signal to fix the position of the plunger 56. If desired, the solenoid 54 may also be configured to act, under the guidance of the control signal, and prior to fixing the position of the plunger 56, to displace the latch portion 40 to the second position. This may be useful to be sure that the latch portion 40 is in a precise operative location before the plunger 56 temporarily locks the position of the latch portion 40.

This is of particular benefit since the solenoid 54 has the capacity to hold the latch portion 40 in its second position, thus maintaining, via the cables 42, 44 the restraint belt retractors 26, 28 in the release position, allowing the operator and/or the wheelchair passenger sufficient time to connect or disconnect the restraint belts 22, 24 to ready the wheel chair 14 for travel or for departure.

Figure 7:
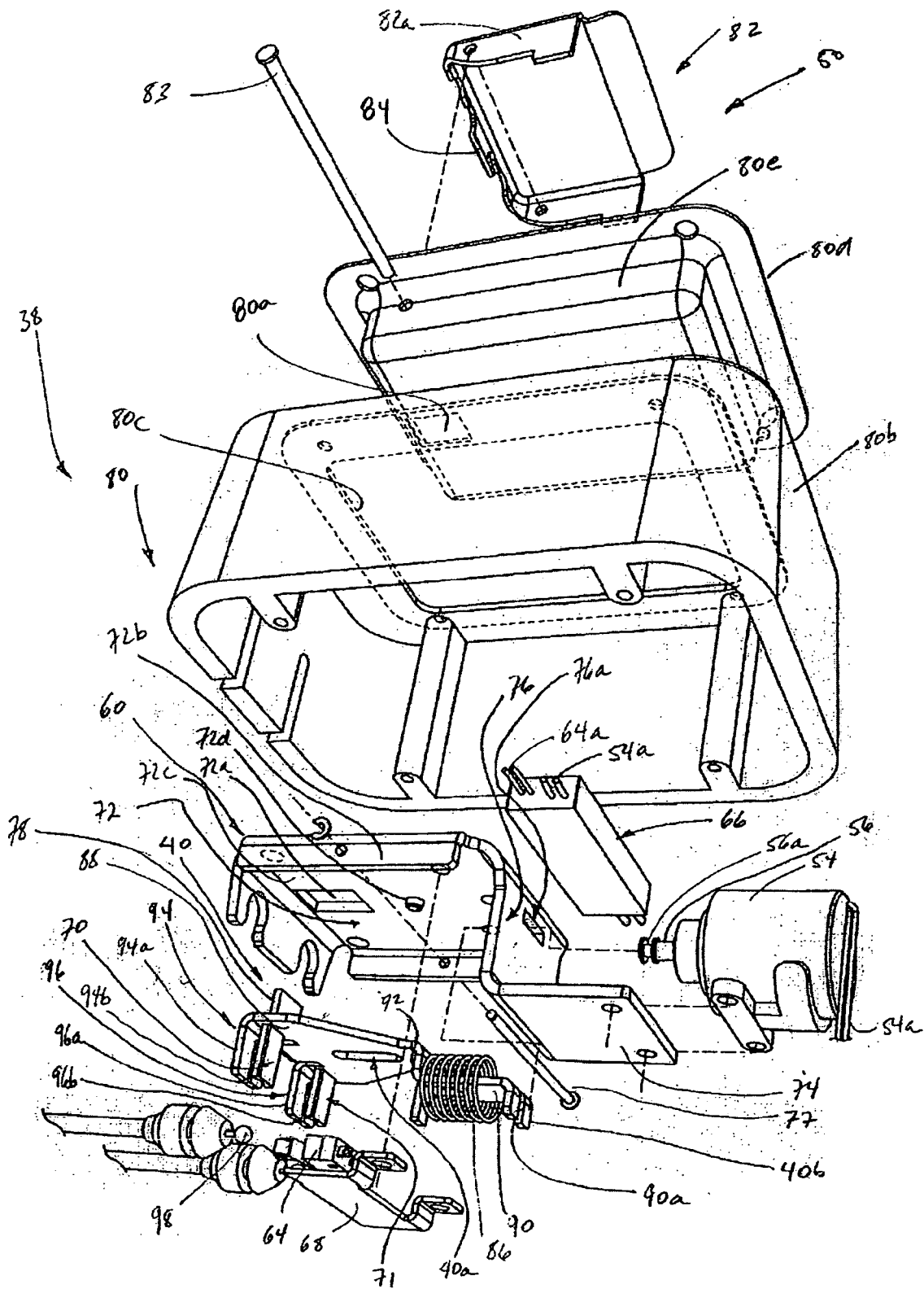
FIG. 7 is a fragmentary perspective assembly view of the portion of FIGS. 3 and 4.

Referring to FIG. 7, the deployment unit 38 has a base frame portion 60 and the latch portion 40 is slidably engaged therewith.

Figure 10:
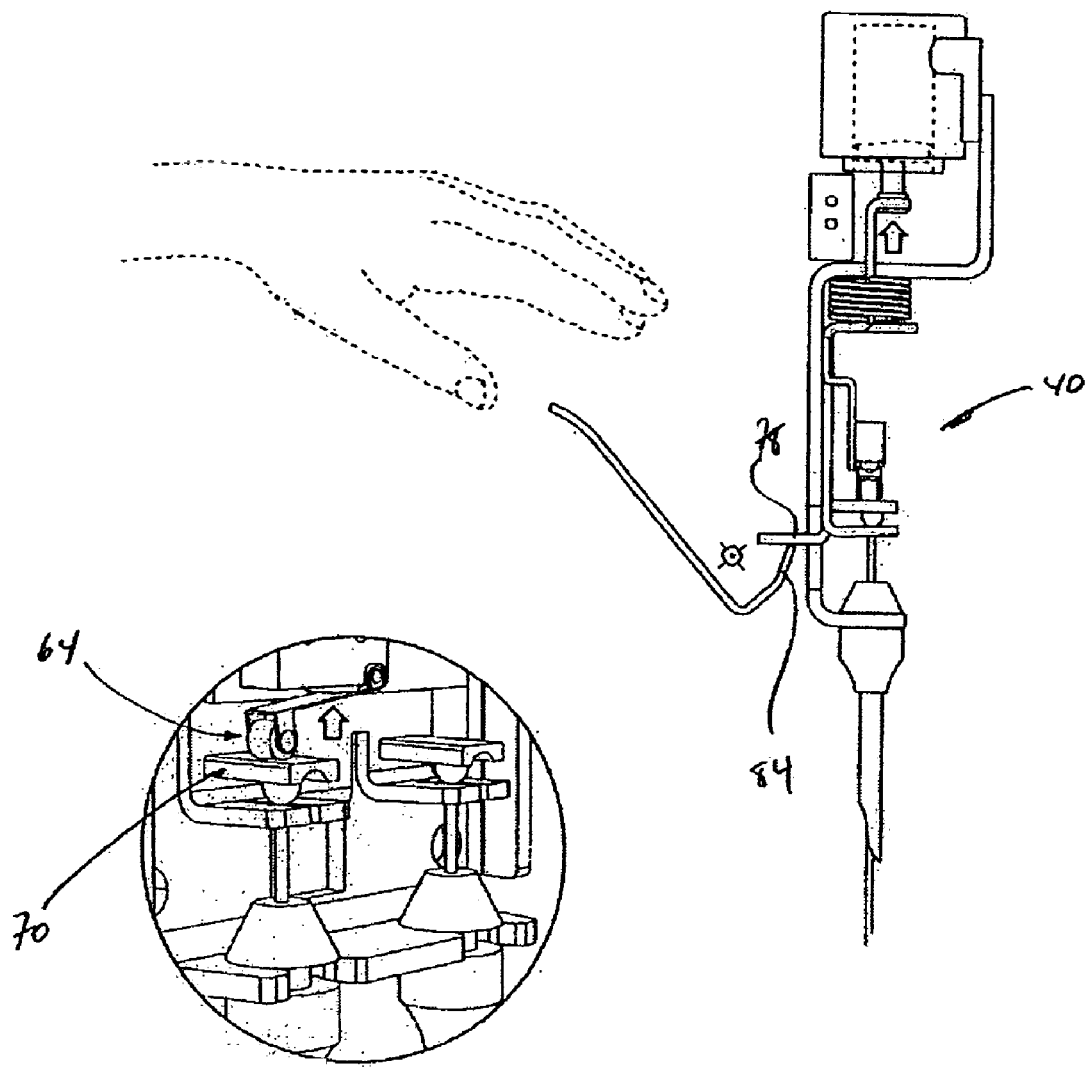

Referring to FIGS. 4 and 7, a timing circuit is generally shown at 62 for delivering the control signal to the solenoid 54. The timing circuit 62 includes a switch unit 64 and a power supply unit 66. The switch unit 64 is, in this case a proximity switch supported by a bracket 68 which is fastened to the base frame portion 60. The proximity switch 64 is operable to command the power supply unit 66 via signal path 64a to deliver the control signal to the solenoid 54 via signal path 54a when the latch portion 40 arrives at or near the second position. Referring to FIGS. 7 and 10, the latch portion 40 cooperates with the timing circuit 62 by providing a pair of abutments 70, 71, one of which is positioned in the path of the proximity switch 64, and causes the latter to signal the solenoid 54 when the proximity switch 64 contacts the abutment 70.

Figure 3:
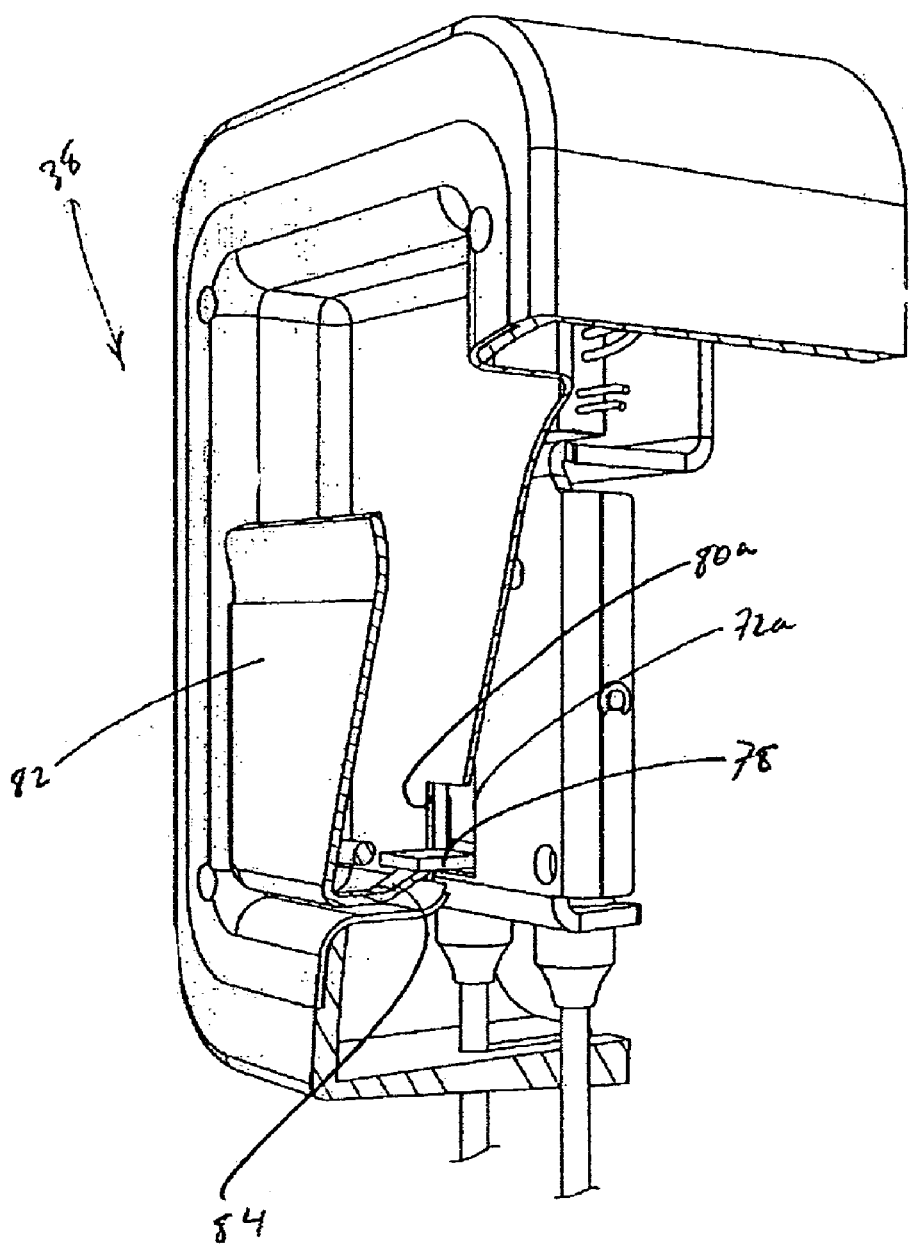
FIGS. 3 and 4 are fragmentary perspective views of a portion of the device of FIG. 2.

Referring once again to FIG. 4, the base frame portion 60 includes first and second offset base frame segments 72, 74 joined by a central segment 76 extending therebetween. It will be seen that the latch portion 40 is positioned adjacent and slides against the first base frame segment 72 while the solenoid 54 is supported by the second base frame segment 74. Referring to FIGS. 3 and 7, the first base frame segment 72 includes a first window 72a and the latch portion 40 has a flange 78 which extends through the first window 72a.

The first base frame segment 72 has a pair of opposed base frame portion boundary walls 72b which have aligned passages to receive an anchor pin 77 therein. The anchor pin 77 is thus operable to restrain the latch portion in position adjacent the first base frame segment 72.

The first base frame segment 72 also has a surface 72c facing the latch portion 40 and a projection 72d extending outwardly from the surface 72c. The latch portion 40 has a slot 40a which is dimensioned to receive the projection 72d therein, thereby to limit travel of the latch portion according to the travel of the projection along the slot 40a.

The deployment unit 50 has a housing shown at 80 to enclose the latch portion 40, the base frame portion 60 and the solenoid 54. The housing 80 has a body portion 80b with a first opening 80c, and a cover portion 80d to fit within the first opening 80c.

In this case, the cover portion 80d includes a second window 80a aligned with the first window 72a. Thus, the first and second windows 72a, 80a, are arranged to permit the flange 78 to interrupt a travel path of the displacement portion 50. In this case, the displacement portion 50 includes a handle 82 pivotally mounted to housing 80. The handle 82 has a central web 84 to engage the flange 78.

The handle 82 includes a pair of opposed handle boundary walls 82a and the cover portion 80d has a pair of opposed cover walls 80e. In this case, the opposed handle boundary walls 82a and cover walls 80e have aligned pivot locations to receive a pivot element 83 for pivotally mounting the handle 82 to the cover portion 80d.

Referring to FIG. 4, the latch portion 40 is biased toward the first position by way of a spring shown at 86 which operates between the central segment 76 and latch portion 40 to bias the latch portion 40 toward the first position. The central segment 76 includes a passage 76a, as best seen in FIG. 7. The latch portion 40 extends through the passage 76a and has a remote end region 40b which is coupled with the plunger 56. In this case, the latch portion 40 includes first and second offset latch segments 88, 90 joined by an intermediate segment 92. It will be seen that the second latch segment 90 extends through the passage 76a and spring 86. The second latch segment 90 also includes a slot 90a to receive a corresponding end flange 56a on the plunger 56.

The first latch segment 88 has a pair of anchor formations 94, 96 to receive a corresponding cable 42, 44 therebetween. Each anchor formation 94, 96 includes a web 94a, 96a with the slot 94b, 96b formed in a central region thereof. Each anchor formation 94, 96 is also located adjacent a corresponding abutment 70, 71.

The first cable ends 42a, 44a each have a spherical bead 98. The spacing between the anchor formations 94, 96 and the corresponding abutments 70, 71 is selected so that the spherical bead 98 can be held snugly between them. As can be seen in FIG. 4, each abutment 70, 71 has a circular cross sectioned inner surface 70a, 71a to complement the shape of the spherical bead 98. The anchor formations 94, 96 are operable to displace the cables 42, 44 between the first and second positions. Each of the cables 42, 44 has an outer sheath 42c, 44c which is coupled with the first base frame segment 72. In this case, each outer sheath has an outer collar portion 42d, 44d and the first base frame segment 72 has an end wall 100 with a pair of passages 102, each dimensioned to hold a corresponding outer collar portion. In this case, the latch portion 40 "pulls" the cable when traveling to the first position and "pushes" the cable when moving towards the second position. This "pushing" effect is advantageous because it ensures that the cable 42, 44 will land at the position necessary to lock the corresponding restraint belt retractor 26, 28, against frictional forces between the cable and its outer sheath 42c, 44c that may arise over time.

Referring to figure 2, the outer sheath 42c, 44c of the cables 42, 44 are also anchored to a mounting flange 103, 105 provided on the restraint belt retractors 26, 28. The second end 42b, 44b of each cable is in turn coupled with a corresponding activating lever 106, 108 which is in turn pivoted to a corresponding external housing 26a, 28a by way of pivot members 110, 112. The activating levers 106, 108 are each oriented with a distal end region 106a, 108 which is aligned with a release trigger 26b, 28b. Thus, when the latch portion is moved to its second position, the cables are drawn upwardly as viewed in figure 2, thereby causing a counter clockwise rotation of the activating levers 106, 108 thereby displacing the corresponding triggers 26b, 28b downwardly to release the restraint belt retractors 26, 28.

The restraint device 20 thus is installed with the restraint belt retractors installed in suitable sites at the wheel chair receiving location 12 in the vehicle 10 with the deployment unit 38 located at a convenient location, either beside a vehicle operator as shown in FIG. 1 or in any number of other locations. Of course, the greater the distance between the restraint belt retractors 26, 28, the greater the length needed for the cables 42, 44.

Figure 8:
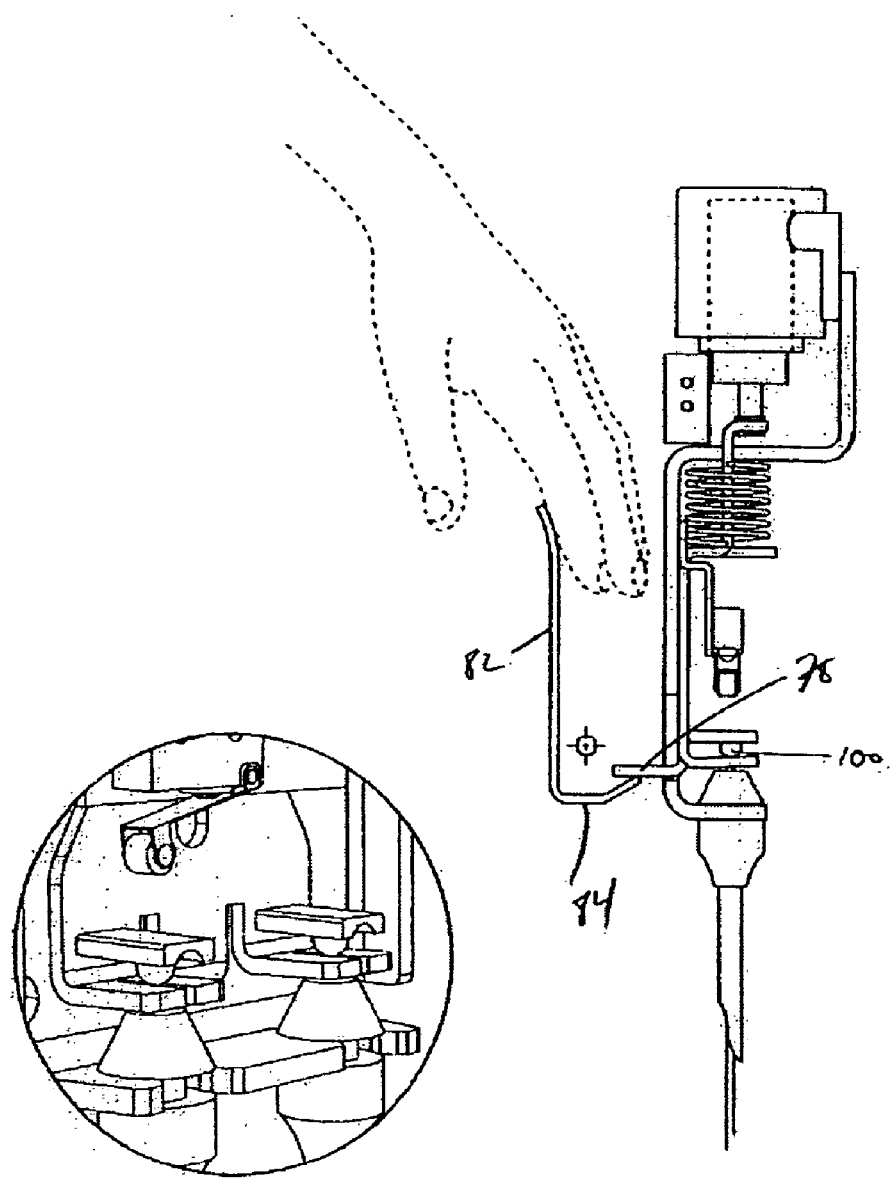
FIGS. 8 through 13 are schematic and/or magnified fragmentary perspective views of the portion of FIGS. 3 and 4 in different operating configurations.
Figure 9:
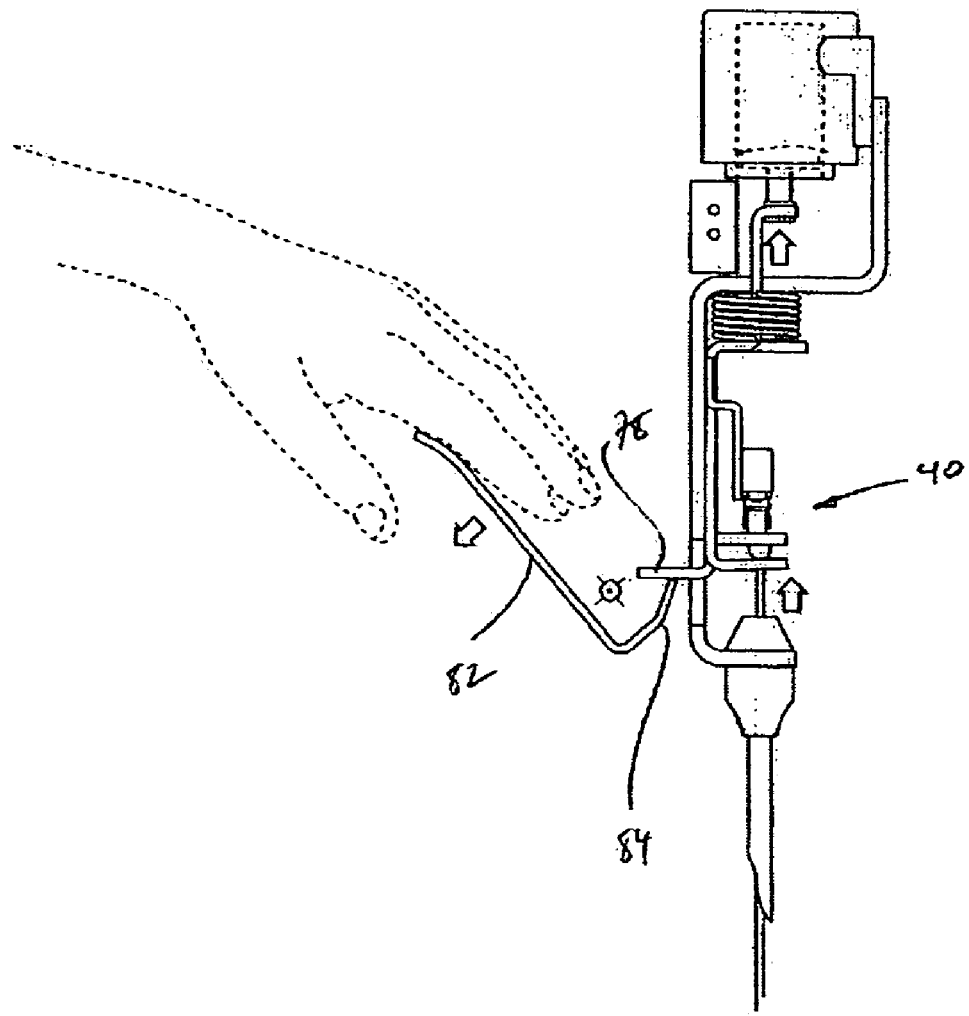
Figure 11:
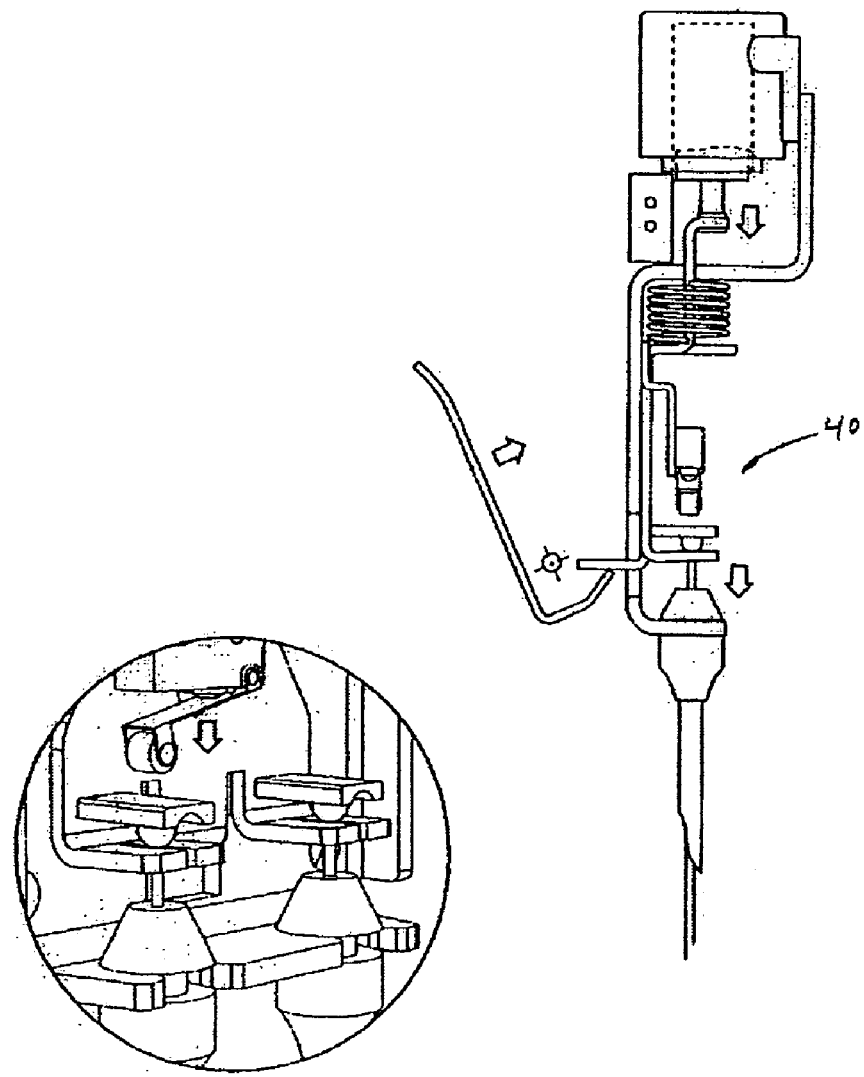
Figure 12:
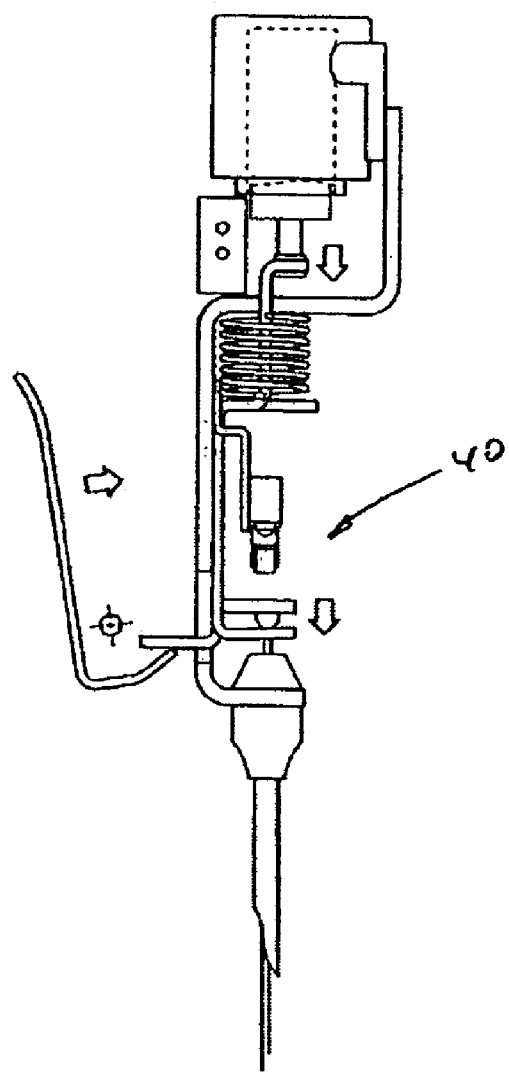
Figure 13:
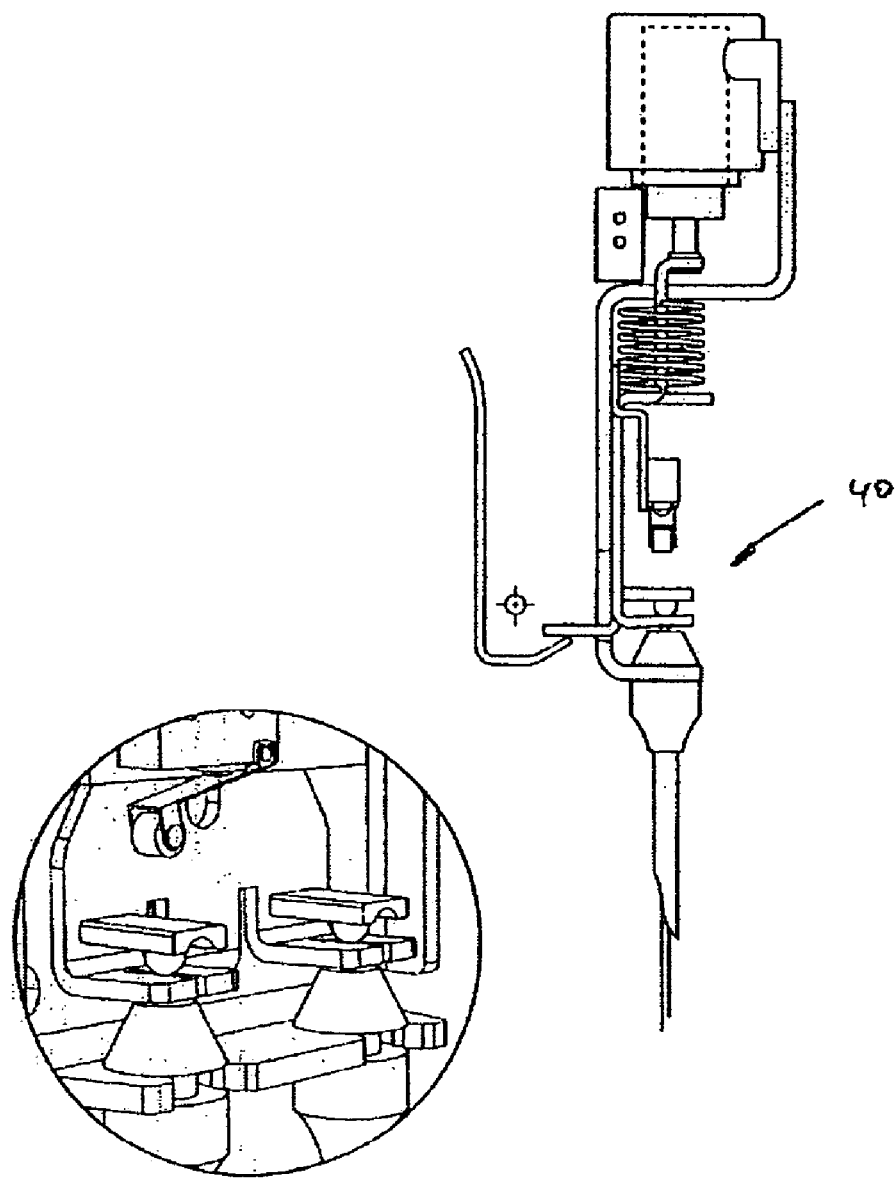
Figure 14:
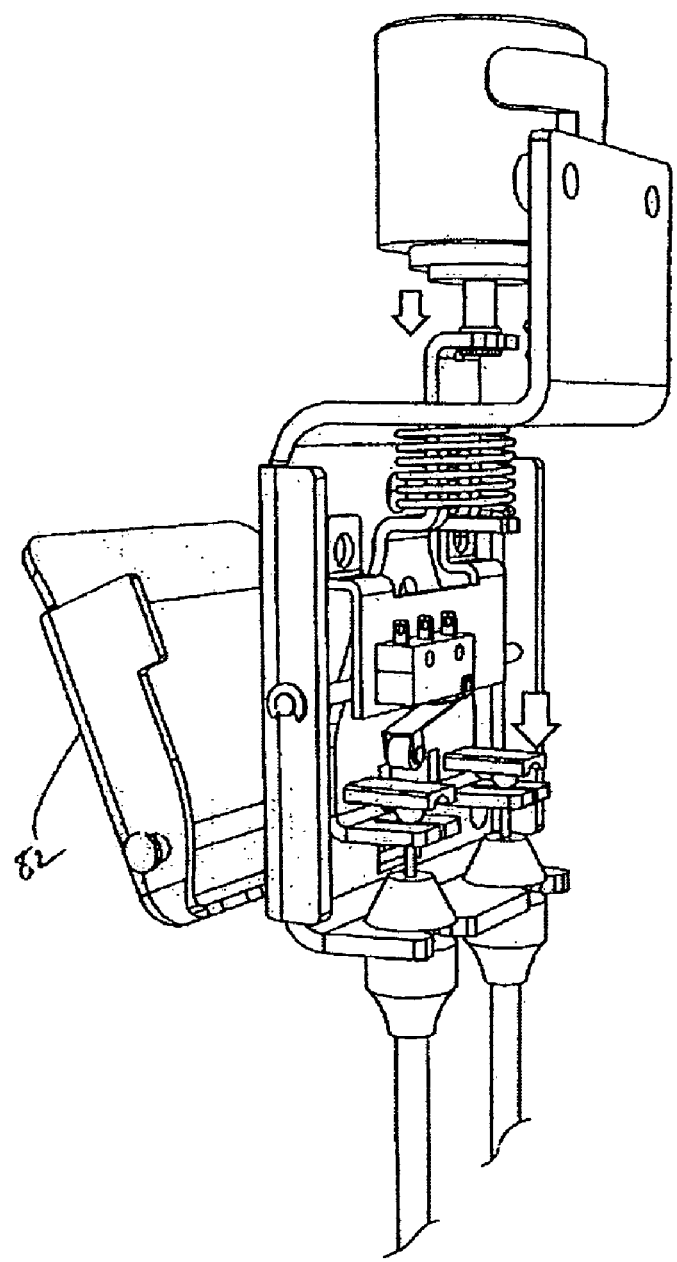
FIGS. 14 through 15 are fragmentary perspective views of the portion of FIGS. 3 and 4 in different operating configurations.
Figure 15:
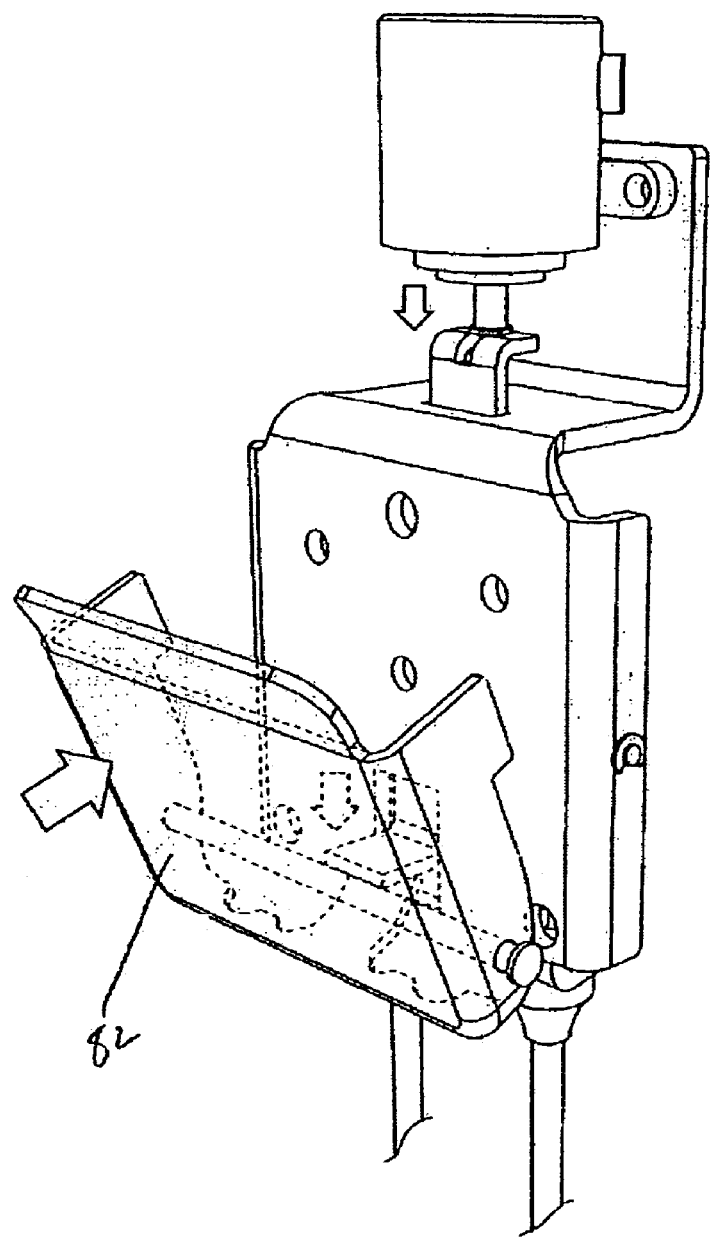

In their rest position, the restraint belt retractors 26, 28 lock the restraint belt 22, 24 in position which means that the length of the restraint belt beyond the housings 26a, 28a is fixed in each case. An occupant in a wheel chair may then be delivered to the wheel chair receiving location 12 with the appropriate locations on the wheel chair aligned with the corresponding restraint belt retractors 26, 28. The vehicle operator then grips and depresses the handle 82 as shown in the figures 8 and 9 which causes the latch portion 40 to move upwardly as viewed in these figures under the force delivered thereto via the central web 84 and flange 78 against the biasing action of the spring 86. This causes the switch unit 64 to approach the abutment 70 until contact is made between them, as shown in the magnified view of figure 10, causing the switch unit 64 to trigger the power supply unit 66 to energize the solenoid 54, freezing the position of the plunger 56 and locking the position of the latch portion 40. The power supply unit 66 includes a timing function in which a clock counts out a predetermined clock sequence in which the solenoid remains energized. Of course, while the latch portion moves upwardly as viewed in figures 8 and 9, the cables 42 and 44 move in a manner causing the activating levers 106, 108 to pivot with their distal end regions 106a, 108a contacting and displacing the corresponding release triggers 26b, 28b. Consequently, at the point in which the latch portion 40 is locked in position (as shown in figure 10), as are the release triggers 26b, 28b in their release position, thereby allowing the operator and/or the occupant to secure the hooks 30 on the wheel chairs and allowing the restraint belt retractors 26, 28 to recoil to provide a suitable tension level on the restraint belts 22, 24. It follows that the predetermined time period selected for the timing circuit should be sufficient to allow this function to be completed, at which time the solenoid 54 is automatically de-energized to free the plunger 56 and latch portion 40, allowing the latter to fall to its rest position, as shown by the succession of views in figures 11, 12 and 13. Similar views to figure 11 are shown in figures 14 and 15.

If desired, the timing circuit 62 may be preset to provide a fixed predetermined operating sequence. Alternatively, the timing circuit 62 may be equipped with a control portion as shown at 64b in FIG. 2 on an outside surface of the deployment unit 38 to permit the operating sequence to be adjusted, as desired. For instance, it may be that one vehicle operator is able to load or unload the wheel chair in a shorter time period, thereby requiring a shorter predetermined period of time during which the latch portion 40 is held "open", i.e. with the retractors 26, 28 in their release position. This control portion may, for instance, employ a multiple position switch, with each position indicative of one predetermined time period, such as ten seconds, twenty seconds and thirty seconds, or in other time increments as desired.

The restraint device 20 may use different types of restraint belt retractors including those in which the trigger controls two operating conditions thereof, namely a locked condition and a release condition. The restraint device 20 may be also be used for those retractors which have three operating conditions, a first condition when the belt is in a "rest" condition when the restraining belt is fully recoiled in the retractor. In this "rest" condition, the belt may be removed from the retractor without actually depressing the trigger. The retractor then has a second lock condition in which the belt can only be retracted. This second lock condition automatically occurs after the belt changes direction and is at least partially retracted by the retractor. In this second lock condition, the trigger then locks the belt from any further removal from the housing but may be retracted or recoiled into the housing. Thus, the locking function in this second lock condition is "one way", allowing retractors if this type to tighten the restraint belt as the vehicle operates by automatically taking up slack. The retractor then has a third release condition in which the belt may be removed from (or drawn from) the retractor only when the trigger is depressed. Thus, the restraint device 20 may be used to control these retractors with three operating conditions by controlling the second and third conditions, while allowing the belt to be drawn from the retractor in the first condition and allowing the retractor to automatically take up slack in the second position.

Of course, while the restraint device 20 is especially suited for wheel chair transport, it may also be used securing other cargo in other land, sea or air vehicles, and is us not necessarily limited to wheelchair passenger transportation systems.

While the solenoid 54 is provided on the deployment unit 38, it may alternatively be located in other locations in the restraint device 20, such as, for instance, as an accessory to the restraint belt retractors 26, 28 themselves. The solenoid may be replaced by other means of suspending the latch portion 40, such as with hydraulic, mechanical or magnetic arrangements or a combination thereof. Moreover, the deployment unit 38 may be used for remote activation in situations which do not necessarily require the use of a solenoid 54 or other suspension portion. While the solenoid 54 is used for the locking in some cases and the pulling and locking in other cases, of the latch portion 40, to its second position, the solenoid 54 may also be used to push the latch portion, and hence the cables 42, 44, to their rest position, rather than relying entirely on the spring 86.

While the timing circuit has the benefit of automatically controlling the locking of the latch portion 40, the timing circuit may, if desired, be provided with a manual two way switch, first to lock the latch portion 40 and, second, to release it. Further, the timing circuit 62 may be provided with a manual override, as desired, for instance just in case the predetermined time period is too long for a specific situation.

If desired, the deployment of the handle 82 and the displacement of the latch portion 40 may be provided by way of other direct or indirect mechanical or electrical linkages, for example by the use of other solenoids and the like.

While the restraint device 20 makes use of a latch which is slidably mounted on a frame base frame portion, it will be understood that other restraint devices may be used including those in which a latch is not necessarily slidably mounted, nor provided with the structure shown herein. For instance, the restraint device may make use of other types of restraint members, such as hooks which are pivoted to an anchor structure adjacent a payload receiving area and actuated by a linear actuator, a hydraulic ram, a servo motor or the like to engage a cargo item, or other securement devices for securing wheel chairs to wheel chair transport vehicles.

Thus, in one example, the retractor device provides a restraint member retractor (or some other form of restraint member actuator) involving a trigger to transfer the restraint member retractor from a lock condition to a release condition and, in this example, a remote controller to control the position of the trigger. The retractor device is further provided with a communication link between the remote controller and the trigger for control signals to be exchanged therebetween, and the capability to automatically suspend the trigger in the release position for a predetermined period of time. As the restraint device 20 shows above, this can be achieved with a solenoid which temporarily freezes the position of the actuator. This temporary freezing function may be either be manually implemented by a two stage on/off function so that it can be manually deployed (by energizing the solenoid) for sufficient time for the operator to attach or remove the wheel chair, and then manually released (by de-energizing the solenoid).

The communication link may, as the restraint device 20 shows above, be provided by way of the cables 42 and 44. However, other such communication links may be provided, such as a wired communication channel 104a or a wireless communication channel 104b between the restraint member retractor and the remote controller and arranging the restraint member retractor and the remote controller to exchange control signals over the communication channel. In this case, the signals are provided in analog, digital, and in electrical, magnetic, optic or in another form, provided on a carrier signal or over a predetermined frequency range or pattern, such as for example using a wireless spread spectrum protocol. The communication channel may be, for instance, a wireless RF data link.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A control device for controlling a restraint belt retractor, comprising a latch portion, a cable with a first end arranged to be joined to the latch portion and a second end arranged to be operatively associated with the restraint belt retractor, the latch portion being movable between a first position in which the cable is arranged to maintain the restraint belt retractor in a locked position and a second position in which the cable is arranged to maintain the restraint belt retractor in a released position, a displacement portion for displacing the latch portion between the first and second positions, the latch portion being biased toward the first position, a suspension portion for suspending the latch portion at or near the second position for a predetermined period of time, thereby to permit operation of the restraint belt retractor in the released position.

2. A device as defined in claim 1, the suspension portion including a solenoid unit with a plunger coupled with the latch portion, the solenoid unit being operable under a control signal to fix the position of the plunger, the solenoid unit being operable under the control signal, prior to fixing the position of the plunger, to displace the latch portion to second position.

3. A device as defined in claim 2, further comprising a base frame portion, the latch portion being slidably engaged therewith.

4. A device as defined in claim 3, further comprising a timing circuit for delivering the control signal to the solenoid unit, the timing circuit including a switch unit and a power supply unit, the switch unit being operable to command the power supply unit to deliver the control signal when the latch portion arrives at or near the second position.

5. A device as defined in claim 4, the latch portion having an abutment, the switch unit including a proximity switch to signal the solenoid unit when the proximity switch contacts the abutment, a bracket fastened to the base frame portion and supporting the proximity switch, the base frame portion including first and second offset base frame segments being joined by a central segment extending therebetween, the first base frame segment engaging the latch portion and the second base frame segment engaging the solenoid unit, the first base frame segment including a first window, the latch portion having a flange extending through the first window, the first window and flange being arranged to interrupt a travel path of the displacement portion.

6. A device as defined in claim 5, wherein the latch portion includes a flange which is arranged to interrupt a travel path of the displacement portion.

7. A device as defined in claim 6, further comprising a housing to enclose the latch portion, the base frame portion and the solenoid unit, the housing including a second window aligned with the first window.

8. A device as defined in claim 7, the displacement portion including a handle pivotally mounted to housing, the handle having a central web to engage the flange, a spring element operating between the central segment and latch portion to bias the latch portion toward the first position, the central segment including a passage, the latch portion extending through the passage with a remote end region which is coupled with the plunger, the latch portion including first and second offset latch segments joined by an intermediate segment, the second latch segment extending through the passage, the second latch segment including a slot to receive the plunger, the second latch segment extending through the spring element, the first latch segment being coupled with the cable, the first latch segment including a slot to receive the cable, the first latch segment having a pair of spaced anchor formations to receive the cable therebetween, each anchor formation including a web with the slot formed in a central region thereof, the anchor formations being operable to displace the cables between the first and second positions, the cable including an outer sheath, the outer sheath being coupled with the base frame portion, the base frame portion including a passage, the cable including an outer collar portion held within the passage, the first base frame segment including a pair of opposed base frame portion boundary walls, the boundary walls having aligned passages to receive an anchor pin therein, the anchor pin operable to restrain the latch portion in position adjacent the first base frame segment, the first base frame segment having a surface facing the latch portion, a projection extending outwardly from the surface, the latch portion having a slot which is dimensioned to receive the projection therein, thereby to limit travel of the latch portion according to the travel of the projection along the slot, the housing having a body portion with a first opening, and a cover portion to fit within the first opening, the handle including a pair of opposed handle boundary walls, the cover portion having opposed cover walls, the opposed handle boundary and cover walls having aligned pivot locations, and a pivot element located at the aligned pivot locations for pivotally mounting the handle to the cover portion.

9. A belt retractor device, comprising a cable release portion operatively coupled with a belt retractor portion, the belt retractor portion having a length of safety belt coiled therein, the cable release portion having at least one cable with first and second cable ends, the cable release portion having a slide member with an anchor formation to receive the first cable end, and a handle to displace the slide member between opposed first limit positions, thereby to displace the cable between opposed second limit positions; the belt retractor portion including a trigger operable in a first phase for locking the retractor portion in position and a second phase for releasing the retractor portion to recoil the safety belt, the cable release portion including an actuator operatively joined with the second cable end for actuating the trigger between the first and second phases, the retractor portion further including a dwell unit for suspending the slide member near one limit position for a predetermined period of time thereby to maintain the trigger in the second phase for the predetermined period of time.

10. A restraint belt control device comprising a belt retractor portion and a remote belt release portion communicating therewith, the belt retractor portion being operable between a first rest position and a second activated position, and a dwell portion associated with one of either the remote belt release portion or the belt retractor portion, the dwell portion being operable in a first phase for maintaining the belt retractor portion in the second activated position for a predetermined time period and a second phase for releasing the belt retractor portion from the second activated position after the predetermined time period has passed.

11. A device as defined in claim 10, further comprising a cable joining the remote belt release portion with the belt retractor portion, the cable being moveable between two limit positions to transfer the belt retractor portion between the first rest position and the second activated position, the dwell portion being operable to control the deployment of the cable between the two limit positions.

12. A device as defined in claim 11, wherein, in the second phase, the dwell portion is operable to displace the cable to one of the two limit positions to return the belt retractor portion to the first rest position.

13. A device as defined in claim 12, wherein the remote belt release portion includes a base and a latch moveable relative thereto, the dwell portion being coupled between the base and the latch.

14. A device as defined in claim 13, wherein the dwell portion includes a solenoid with a plunger, the plunger being coupled with the latch and a timing circuit for operating the solenoid between the first and second phases.

15. A control device for controlling a restraint belt retractor, comprising a deployment portion including latch portion, a cable with a first end arranged to be joined to the latch portion and a second end arranged to be operatively associated with the restraint belt retractor, the latch portion being movable between a first position in which the cable is arranged to maintain the restraint belt retractor in a locked position and a second position in which the cable is arranged to maintain the restraint belt retractor in a released position, a displacement portion moveably mounted relative to the deployment portion for displacing the latch portion between the first and second positions, the latch portion being biased toward the first position, a suspension portion for suspending the latch portion at or near the second position for a predetermined period of time, thereby to permit operation of the restraint belt retractor in the released position.

16. A restraint system, comprising a belt retractor, a belt retractor controller remote from the belt retractor, a data link between the belt retractor and the belt retractor controller, the belt retractor and the belt retractor controller being operable to exchange control signals over the data link to provide control of the belt tractor by the belt retractor controller, the belt retractor controller being operable in a first phase to lock the belt retractor thereby to lock a belt therein, a second phase to release the belt retractor thereby to allow the belt to be withdrawn from or returned to the belt retractor and a third phase to maintain the belt retractor in a released position for a predetermined period of time and to configure the belt retractor in a locked position after the predetermined period of time has passed to permit the belt to be either installed on a cargo item or removed from the cargo item.

17. A restraint member retractor device for restraining a wheel chair in a wheel chair transport vehicle, comprising a restraint belt, a lock portion for retaining the restraint belt either in a lock position or in a release position, a trigger portion to transfer the lock portion between a lock condition and a release condition, the trigger portion being operable for automatically maintaining the lock portion in the release condition for a predetermined period of time sufficient for manipulating the restraint belt and for automatically configuring the lock portion in the lock condition after the predetermined period of time has passed.

* * * * *